United States Patent

[11] 3,605,048

[72] Inventor Ralph N. Sargent, III
 Westwood, Calif.
[21] Appl. No. 756,103
[22] Filed Aug. 29, 1968
[45] Patented Sept. 14, 1971
[73] Assignee Michael H. Werner
 Los Angeles, Calif.

[54] EXPOSURE CONTROL DEVICE FOR PHOTOGRAPHIC FILM PRINTERS
 15 Claims, 3 Drawing Figs.

[52] U.S. Cl. .................................................. 355/83,
 355/71, 355/108
[51] Int. Cl. .............................................. G03b 27/78
[50] Field of Search ........................................ 355/83,
 104, 108, 105, 109, 68, 69, 71, 110, 111, 80, 99, 103

[56] References Cited
 UNITED STATES PATENTS

| | | | |
|---|---|---|---|
| 2,238,762 | 4/1941 | Whitaker | 355/83 X |
| 3,077,401 | 2/1963 | Grinten et al. | 355/68 X |
| 3,168,860 | 2/1965 | Clerk et al. | 355/103 X |
| 3,438,704 | 4/1969 | Schoen | 355/68 X |
| 3,479,119 | 11/1969 | Miller et al. | 355/68 X |

Primary Examiner—Samuel S. Matthews
Assistant Examiner—Richard L. Moses
Attorney—Beehler & Arant ABSTRACT: A photographic film printer which includes a sensor assembly for monitoring light energy projected in series through segments of a pair of films. Light energy for exposing the print film is emitted through a light output printing aperture of adjustable width, as the film segments are drawn over the printing aperture. The sensor assembly includes a baffle plate positioned adjacent to and in alignment with the light output printing aperture. A plurality of light sensors are mounted on the baffle plate so that the sensors are aligned substantially across the maximum adjustable width of the printing aperture. A light detector assembly is also mounted on the baffle plate, and the light detector responds to light energy transmitted through a section of the printing aperture adjacent to a leading edge thereof. Control means respond to signals produced by the light sensors and the detector to adjust the width of the printing aperture as a preselected function of the printing light energy exposing the film print.

PATENTED SEP 14 1971 3,605,048
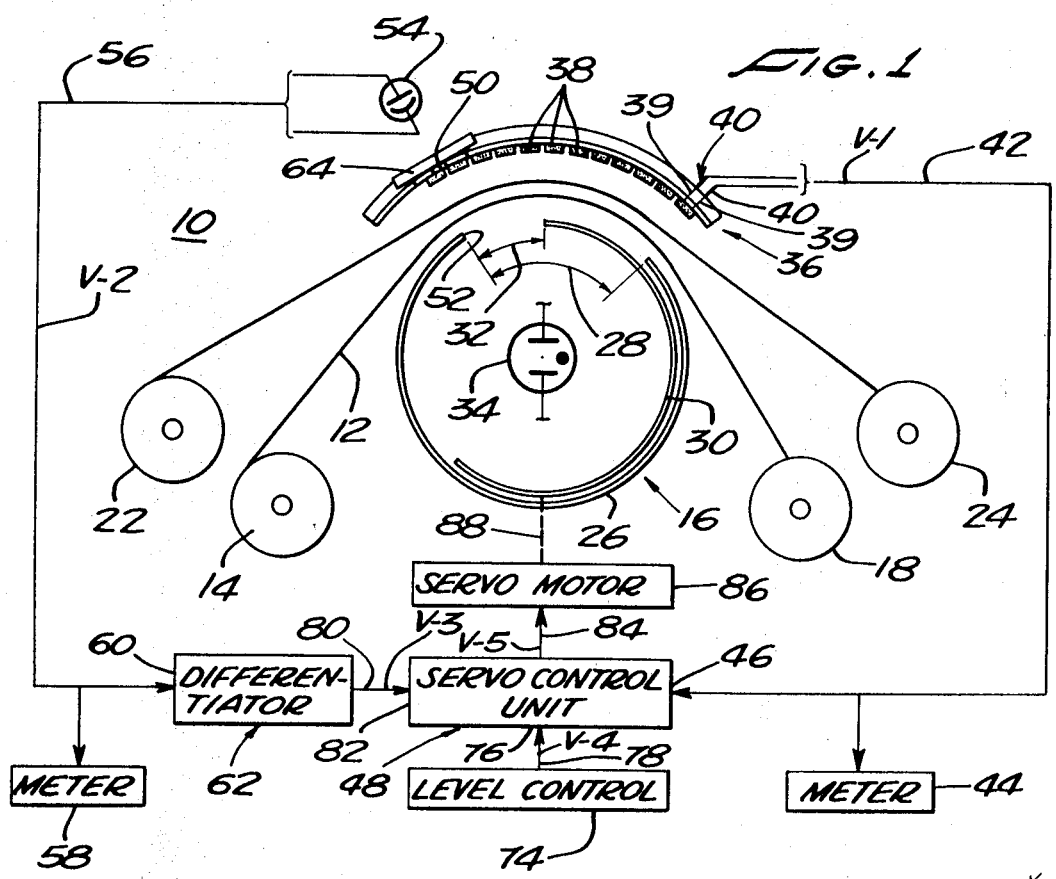
FIG. 1
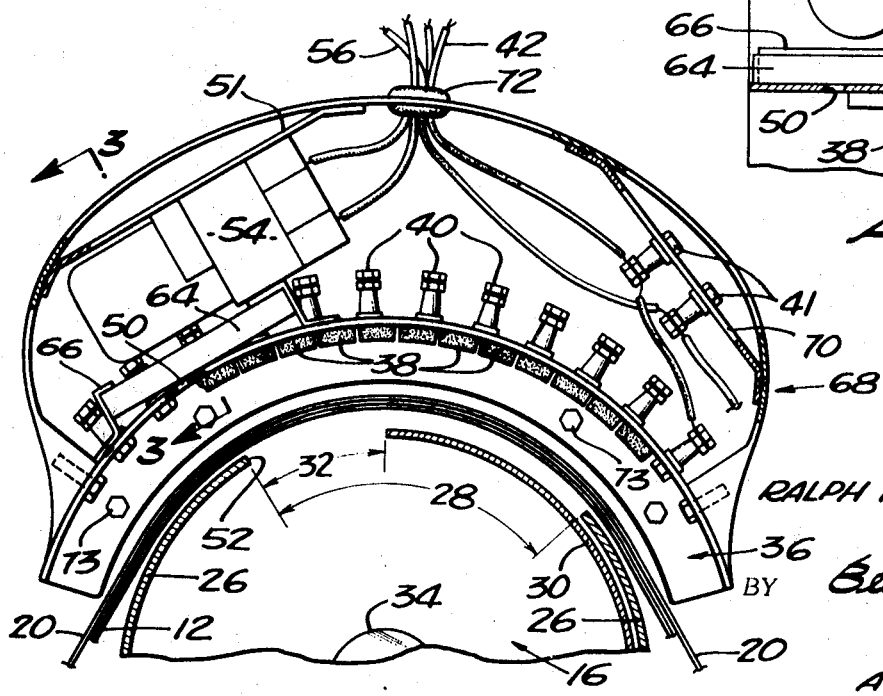
FIG. 2
FIG. 3
RALPH N. SARGENT III
INVENTOR.
BY Beehler & Arant
ATTORNEYS

EXPOSURE CONTROL DEVICE FOR PHOTOGRAPHIC FILM PRINTERS

This invention relates generally to a device for monitoring and controlling the level of printing energy in a photographic film printer. More particularly, the invention relates to a device for continually controlling the printing energy level so that the resultant film print possesses a desired ambient background level characteristic regardless of variations in the ambient level of the master or original film; and for scaling the printing energy level to provide optimum printing between types of films having differing dynamic ranges.

The ordinary method of producing film prints is to project light energy through an original, developed film (positive or negative) and to expose the print film (raw stock) with light energy modulated by the transparency pattern of the original film. The mean or ambient printing level of the raw stock film is a function of the intensity of the printing light source, the transparency of the original film and the exposure time. In applications where the original film possesses a desired uniformity of mean background level throughout a film roll, that is the original film has been "timed," the print may be produced by selecting a single correct setting for the printing light energy level. However in ordinary motion picture productions, for example, the original negative varies in ambient background level due to unavoidable variations in scene lighting and camera adjustments, hence the film must be "timed" before prints for viewing are produced. The standard method of film timing is to view the original film roll and notch or code the film to indicate where changes in ambient background levels have occurred. Then according to the standard method, as the film is printed the printing energy level is varied as indicated by the coding. This manual method although effective, is time consuming and expensive. Particularly, in producing work prints, rather than release prints, the manual method of timing is economically extravagant.

In film printing between an original film and raw stock film having differing dynamic ranges, a need for "scaling" during the printing process arises so as to compress the dynamic range of the original film to be compatible with the raw stock or print film. For example, with the use of new film types such as Kalvar film, described in the "Journal of the Society of Motion Picture and Television Engineers," Mar. 1964, Volume 73, No. 3, "scaling" during film printing is sometimes desirable. Kalvar film is sensitive to light energy in the ultraviolet frequency range and so is not a camera stock; but has great promise of being an economical raw stock for film prints. Therefore if dynamic scaling is automatically provided during film printing the original film can be a conventional silver halide negative film, and the print film a Kalvar-type film.

In accordance with the principles of the subject invention a film printer alignment provided whereby segments of the original film and a raw stock are sequentially passed over a printing head at a constant speed. The printing head has a constant intensity light source for projecting light energy in a selected frequency interval, so as to expose the raw stock film with the light energy that has first been modulated by passing through the original film. The printing head has an output light aperture of adjustable width that is controlled in response to an exposure control device. A light baffle plate mounts a plurality of first light sensors adapted to produce output signals representative of the exposure light energy in a frequency interval of sensitivity of the raw stock film. The plurality of first light sensors are disposed on the light baffle so as to be in A with the maximum adjustable width of the light output aperture. A second sensor device, also responsive in the frequency interval of sensitivity of the raw stock film, is positioned in alignment with the leading edge of the printing aperture so as to sense the transparency of the film frames as they first enter the printing aperture. A control unit responds to signals developed by the first and second sensors, and adjusts the width of the printing aperture so that each film print segment receives the correct amount of exposure energy during the transit of the film segments over the printing head. In one configuration of electrical connections for the first sensors, the signal developed thereby is a nonlinear function of the printing energy whereby a scaling effect is obtained.

Therefore, it is an object of the subject invention to provide an exposure control device for monitoring the total printing energy projected through segments of a pair of film strips as the film strips pass over a printing head assembly having a light output aperture of adjustable width.

Another object of the invention is to provide an exposure control device for a film printer which substantially maintains the mean exposure level of the printed film at a constant selected value.

Another object is to provide an exposure control device for controlling the width of the light output aperture of a printing assembly so that the ambient level of printing energy, exposing the raw stock film, is maintained at a selected value.

A further object is to provide an exposure control device for automatically controlling the light energy for printing a film strip by sensing the value of exposure light energy in a selected frequency range with sensors disposed in alignment with the maximum light output aperture width of a printing head assembly.

Another object is to provide a device for automatically controlling the ambient printing level of a raw stock film, which device exhibits an improved response time to variations in the mean transparency of the original film.

A further object is to provide an automatic control device for film printers which includes means for sensing the variations in transparency of the original film as the original film crosses the leading edge of a printing aperture, and which rapidly adjusts the width of the printing aperture so that the ambient printing level of the raw stock film is substantially maintained at a constant value.

Still another object of the invention is to provide an automatic control device for film printers which maintains the ambient exposure level of the raw stock film at a selected value while nonlinearly scaling the exposure energy level to compensate for differing dynamic ranges between the master film and the raw stock print film.

The above and other objects and advantages of the invention will become more fully apparent from the following description considered in conjunction with the accompanying drawings, wherein:

FIG. 1 is a schematic and block diagram of a film printer incorporating an exposure control device in accordance with the principles of the subject invention.

FIG. 2 is a longitudinal cross-sectional view of the light baffle assembly and a segment of the printing head illustrated schematically in FIG. 1.

FIG. 3 is a cross-sectional view taken on the line 3—3 of FIG. 2.

In the embodiment of the invention chosen by way of illustration, a film printer incorporating the principles of the subject invention is indicated generally by the reference numeral 10. An original or master film 12 is fed from a supply reel 14, over a printing head 16, to a takeup reel 18. The raw stock or print film 20 is fed from a supply reel 22, above the original film 12 and the print head 16, to a takeup reel 24. Conventional drive means (not shown) are coupled to the takeup reels 18 and 24 for synchronously drawing the films 12 and 20 across the print head 16 at a constant speed. Also, conventional guide, tension, and alignment means (not shown) may be provided in the transport path of the films 12 and 20.

In the interest of clarity and so as to more fully demonstrate the scaling, as well as the reference level control features of the subject invention, the film 12 will be assumed to be a conventional silver halide negative and the raw stock 20 a Kalvar-type film. However, it will be understood that in accordance with the principles of the invention the original film 12 may be either a positive or a negative film and that the original and raw stock films may be any type photographic film.

The printing head 16 includes an outer cylindrical drum 26 having an opening 28 formed therein, with the axial dimension of the opening 28 being substantially equal to the width of the films 12 and 20. An inner member 30, having a configuration of a longitudinal section of a cylinder, is rotatably mounted within the outer cylindrical drum 26 thereby forming a printing aperture 32 of adjustable width. A light source 34 is operatively mounted centrally within the printing head 16 and is electrically coupled to a source of electrical power (not shown). Since in the illustrative embodiment described herein the raw stock film 20 is assumed to be Kalvar-type film, the light source 34 may be a mercury vapor lamp having substantial emission in the ultraviolet frequency range where Kalvar film is most sensitive.

An arcuate light baffle assembly 36 is mounted above ultraviolet printing head 16 and is centrally aligned with the opening 28 in the outer cylindrical drum 26. A plurality of photovoltic cells 38 are mounted on, but electrically insulated from the undersurface of the light baffle assembly 36 by means of a dielectric adhesive so as to be aligned substantially across the opening 28. The photovoltic cells 38 are semiconductor devices, well known in the art, and each cell produces an output signal, on a pair of output leads 39, representative of the light energy received thereby. The photovoltic cells 38 are responsive to light energy in the ultraviolet frequency range and are therefore compatible with the frequency response of the Kalvar film selected by way of illustration in the subject description. A plurality of pairs of terminal posts 40 are mounted on and electrically insulated from the top surface of the light baffle assembly 36, with each pair of terminal posts being associated with a different pair of output leads 39. In the interest of clarity, in FIG. 1 only one pair of output leads 39 and terminal posts 40, associated with the photovoltic cell 38 mounted on the extreme right-hand end of the light baffle assembly 36, are shown. However, it will be understood that a pair of output leads 39 are similarly connected to terminal posts 40 associated with each of the photovoltic cells 38; and that the output signals produced by these photovoltic cells are combined by interconnecting the terminal posts 40 in either a conventional series or parallel hookup depending on which of two control configurations are desired, as will be explained in detail subsequently.

The combined output signal from the photovoltic cells 38, V-1, (either connected in series or in parallel) is applied by means of a pair of output terminals 41 (see FIG. 2), and a composite lead 42 to a reference level meter 44 and to a first input circuit 46 of a servomechanism (servo) control unit 48.

An opening 50 is formed through the light baffle assembly 36 directly above the leading edge 52 of the printing aperture 32. A photodiode tube 54 is operatively mounted on the rear surface of the baffle 36 in alignment with the opening 50 by means of a bracket 51. The output signal from the photodiode 54, V-2, is applied in parallel on a composite lead 56 to a negative density meter 58 and to an input circuit 60 of a conventional electronic differentiator 62.

A light filter 64 is mounted to the baffle assembly 36 by meaNs of a mounting bracket 66 and is disposed between the opening 50 and the photodiode tube 54. For applications involving film printing with Kalvar-type film, the light filter 64 is designed to transmit light energy in the ultraviolet frequency range, such as Model No. 18A manufactured by Eastman Kodak Company, Wratten Division.

As shown in FIG. 2, a cover plate 68 encloses the rear surface of the light baffle assembly 36. Bracket 51, for mounting the photodiode tube 54, and a bracket 70 for mounting the terminal posts 41 are attached to the inner surface of the cover 68. A rubber grommet 72 lines a hole formed in the cover 68 through which composite leads 42 and 56 are routed. The cover 68 is mounted to a chassis (not shown) of the film printer 10 by a plurality of bolts 73.

A level control unit 74, which may include a conventional variable voltage source, is coupled to a second input circuit 76 of the servocontrol unit 48 by a lead 78. An output signal, V-3, from differentiator 62 is applied by a lead 80 to a third input circuit 82 of the servocontrol unit 48.

An output signal, V-5, developed by the servocontrol unit 48 is applied on a lead 84 to a servomotor 86. In response to the signal V-5 the servomotor 86 controls the angular position of the inner member 30, through a mechanical linkage 88, and thereby the width of the printing aperture 32.

In the operation of the film printer 10, the original developed film 12, which may be a silver halide-type negative film, and the raw stock film 20, which may be assumed to be a Kalvar-type raw stock film, are drawn by the takeup reels 18 and 24, respectively, over the printing head 16. Light energy, having a strong component in the ultraviolet frequency range, is emitted from the light source 34 and projects first through the original negative film 12, then through the print film 20 and is received by the photovoltic cells 38. The Kalvar-type film 20 is sensitive to, and therefore exposed by, the ultraviolet light energy and a latent image is formed thereon so that after being developed by the processes described in the previously cited "Journal of the Society of Motion Picture and Television Engineers," a positive print of the original film is obtained.

The signal V-1, produced by the photovoltic cells 38, is representative of the intensity of the light source 34 and of the width of the printing aperture 32 and therefore of the printing energy exposing segments of the raw stock film 20 as these segments pass over the printing aperture 32 at a constant speed. In a first or averaging mode of operation of the subject invention the photovoltic cells 38 are connected in series and the signal V-1 is a substantially linear representation of the ultraviolet light energy projecting through the film 20.

As described previously, in ordinary motion picture productions, the original negative varies in ambient background level due to unavoidable variations in scene lighting and camera adjustments so that the original negative film must be "timed" before prints for viewing are produced. In accordance with the principles of the subject invention any change in the ambient or mean background level of the original negative film will be sensed by the photovoltic cells 38 to cause a corresponding variation in the signal V-1. For example, to produce a Kalvar film print of a desired uniform background level, the level control unit 74, which includes a variable voltage source, is adjusted to a voltage level V-4 representative of the desired printing level. If the segment of the negative film 12 passing over the aperture 32 has the correct ambient background level and if the printing aperture 32 is adjusted to the correct position, the signals V-1 and V-4 will balance each other out within the servocontrol unit 48 and no drive signal V-5 is applied to the servomotor 86 and the printing aperture 32 will remain unchanged in width. Also the meter 44 will indicate that the printing energy is at the desired level.

If on the other hand the mean transparency of the film segments 12, passing over the printing head 16, should darken the signal V-1 will decrease in value and the servocontrol unit 48 will provide a drive signal V-5 of the correct polarity to increase the width of the aperture 32 until the signal V-1 is once again at the correct value. Similarly, if the mean or ambient transparency of the negative film segments 12, passing over the printing head 16, should lighten the signal V-1 will increase in value and the servocontrol unit will respond thereto to provide a drive signal V-5 of an opposite polarity so as to decrease the width of the aperture 32 until the signal V-1 is once again at the correct value. The meter 44, which registers the value of the signal V-1, indicates to the operator that the film printer is processing at the desired exposure level.

Satisfactory operation of the film printer 10 may be obtained with the control system comprising the photovoltic cells 38, the level control unit 74, the servocontrol unit 48, the servomotor 86, and the printing head 16, for tracking slow variations in the mean transparency level of the negative film 12. However, if improved performance is desired in tracking sudden changes in the transparency level of the negative film 12, this improved performance may be obtained by incorporation of the photodiode tube 54 and the differentiator 62 as will be explained hereinafter.

The photodiode tube 54 is positioned in alignment with the leading edge of the printing aperture 32 and receives light energy in the ultraviolet frequency range that passes through the opening 50 and the light filter 64. Therefore, the signal V-2 produced by the photodiode tube 54 indicates immediately a change in the transparency of the negative film 12 as the film first enters the printing aperture 32. The signal V-2 is differentiated within differentiator 62, which may consist of a conventional capacitor-resistor circuit, so as to produce the signal V-3 representative of the direction and magnitude of the change in the transparency of the negative film 12. The signal V-3 is summed with the signal V-1 in the servocontrol unit 48 at the correct scale factor and with the correct polarity so as to increase the response of the system to sudden changes in the transparency of the negative film 12. When the mean transparency of the negative film is constant, then the signal V-3 is essentially at a zero level and the sensors 38 control the width of the aperture 32. However if a sudden change in the transparency of the film 12 occurs, a pulse of short duration is produced by the differentiator 62 of the correct polarity to rapidly drive the inner member 30 towards the correct position. Therefore, the photodiode tube 34 and differentiator 62 function in as similar manner to a lead network of a conventional electrical-mechanical control system.

The techniques for designing the servocontrol unit 48 so that the signals V-1, V-3 and V-4 are combined in a properly phased relationship and with the proper gain scale factor for overall system optimized response and stability are well known in the art of electrical-mechanical control systems and therefore the details will not be discussed herein. Such techniques for designing servomechanism control systems with maximum response and stability are described in the text "Control System Analysis and Synthesis" by D'Azzo and Houpis, published by McGraw-Hill, New York, N.Y. 1960.

In the above-described averaging mode of operation the photovoltic cells 38 are connected in series resulting in a system response which is substantially linear, and the width of the printing aperture 32 is controlled to maintain the ambient printing energy uniform for all segments of the print film 20. In a second or scaling mode of operation the photovoltic cells 38 are connected in parallel wherein the signal V-1 is an exponential function of the ultraviolet printing energy projected upon the photovoltic cells 38. The operation of the scaling mode is similar to that of the averaging mode just described, except for the nonlinear response of the system. This nonlinear response results in an effective compression of the dynamic range of the original negative film 12. In the case where the original negative film 12 is a silver halide-type film and the print raw stock is a Kalvar-type film, this compression feature of the scaling mode produces a desired compatibility between the two film types. This "scaling" effect increases the attractiveness of the less expensive Kalvar-type film as a printing stock, even though it is not readily adaptable for use as camera stock to produce an original negative print.

Thus there has been described a film printer which incorporates novel exposure control means for automatically controlling the mean exposure level of a film print in either an averaging mode of operation for automatically "timing" the film print, or in a second scaling mode of operation for effectively compressing the dynamic range of the original film to be compatible with that of the print stock. While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A sensor assembly for monitoring light energy projected in series through a pair of film strips from a light source assembly having a light output printing aperture of adjustable width, said sensor assembly comprising:
   a baffle plate positioned adjacent to and in alignment with the light output printing aperture, so that the pair of film strips are disposed between the baffle plate and the aperture;
   a plurality of light sensors mounted on said baffle plate so that each of the sensors intercepts a different portion of the light energy transmitted through said light output aperture, and with said plurality of sensors being distributed substantially across the maximum adjustable width of the aperture;
   signal means coupled to said plurality of sensors for developing a first output signal representative of the light energy passing through said pair of film strips;
   a first meter coupled to said signal means and responding to said first output signal for providing an indication of the light energy passing through said film strips;
   whereby the width of the light output printing aperture may be adjusted for a selected value of printing light energy; and
   said light sensors being semiconductor devices which respond to light energy in a selected frequency interval, and said signal means comprising means for connecting said semiconductor devices in series, whereby the first output signal is substantially a linear representation of the light intensity in said selected frequency interval, passing through said pair of film strips.

2. A sensor assembly for monitoring light energy projected in series through a pair of film strips from a light source assembly having a light output printing aperture of adjustable width, said sensor assembly comprising:
   a baffle plate positioned adjacent to and in alignment with the light output printing aperture, so that the pair of film strips are disposed between the baffle plate and the aperture;
   a plurality of light sensors mounted on said baffle plate so that each of the sensors intercepts a different portion of the light energy transmitted through said light output aperture, and with said plurality of sensors being distributed substantially across the maximum adjustable width of the aperture;
   signal means coupled to said plurality of sensors for developing a first output signal representative of the light energy passing through said pair of film strips; and
   a light detector assembly mounted on said baffle plate so that said light detector assembly responds to light energy, transmitted through a section of said printing aperture adjacent to a first side edge of the aperture associated with the minimum adjustable width of the aperture, to produce a second output signal representative of the light intensity received by said light detector assembly.

3. The apparatus of claim 2 wherein said light detector assembly comprises an opening formed in said baffle plate; a photodiode device operatively mounted on a face of said baffle plate remote from said light source and in alignment with said opening; and an optical filter disposed between said opening and said photodiode device; whereby said second output signal is substantially a linear representation of the light intensity, in a selected frequency interval, passing through said opening.

4. The apparatus of claim 3 further comprising a second meter coupled to said photodiode device and responding to the second output signal, for providing an indication of the relative light intensity received by said photodiode device.

5. A system for controlling the amount of printing light energy projected in series through portions of a pair of films as the films move across a light source assembly, having an adjustable light output aperture and an adjustment control for varying the width of the output aperture, said system comprising:
   a baffle plate positioned adjacent to and in alignment with the light output aperture so that the films pass between the baffle plate and the light output aperture;

a plurality of light sensors mounted on said plate so that each of said sensors intercepts the light energy transmitted through a different section across the width of said light output aperture, and with said plurality of sensors being distributed substantially across the maximum adjustable width of the light output aperture;

signal means coupled to said plurality of sensors for developing a first output signal representative of the light intensity passing through portions of the pair of film strips as the film strips pass across the output aperture of the light source;

control means coupled to said signal means and to the adjustment control of the light source assembly for varying the width of the light output aperture in response to said first output signal;

whereby the amount of printing light energy projected in series through each of the portions of the films as the films pass across the light source assembly is controlled thereby;

a light detector assembly mounted on said baffle plate so that said light detector assembly responds to light energy, transmitted through a section of said printing aperture adjacent to a leading edge of the aperture relative to the direction of movement of the film, to produce a second output signal representative of the light intensity received by said light detector assembly; and processor means for generating a third signal representative of the variation of said second signal;

wherein said control means further includes circuitry for responding to the third signal to initiate the positioning of the adjustment control in response to the transparency of the film portion passing over the leading edge of the aperture.

6. The system of claim 5 wherein said control means includes a reference level adjustment control for establishing the amount of printing light energy projected in series through the portions of the films as the films pass across the light source assembly.

7. The system of claim 5 further comprising a first meter coupled to said signal means and responding to said first output signal for providing an indication of the relative light energy transmitted through the portions of said films as the films pass across the light source assembly.

8. The system of claim 7 with said light sensors being semiconductor devices which respond to light energy in a selected frequency interval, and with said signal means comprising means for connecting said semiconductor devices in series, whereby the first output signal is substantially a linear representation of the light energy, in said selected frequency interval, passing through said pair of film strips; and said control means responds to said first signal so that the printing energy projected in series through each of the portions of the films, as the films pass across the light source assembly is maintained at a selected value.

9. The system of claim 7 with said light sensors being semiconductor devices which respond to light energy in a selected frequency interval and with said signal means comprising means for connecting said semiconductor devices in parallel, whereby the first output signal is substantially a nonlinear representation of the light energy, in said selected frequency interval, passing through said pair of film strips; and said control means responds to said first signal so that the printing light energy projected in series through each of the portions of the films, as the films pass across the light source assembly, is a nonlinear function of the transmissibility of the films, whereby a scaling effect is obtained.

10. The system of claim 7 wherein said light detector assembly comprises an opening formed in said baffle plate; a photodiode device mounted on a face of said baffle plate remote from said light source and in alignment with said opening; and an optical filter disposed between said opening and said photodiode device; whereby said second output signal is substantially a linear representation of the light energy, in a selected frequency interval, passing through said opening.

11. The system of claim 10 further comprising a second meter coupled to said photodiode device and responding to the second output signal, for providing an indication of the relative light energy received by said photodiode device.

12. A film printer comprising:
a printing head having a light source and a light output aperture of adjustable width;
means for sequentially passing segments of a pair of film strips over said light output aperture so that light energy is projected in series through said film segments;
a baffle plate positioned adjacent to and in alignment with the light output aperture so that the film segments pass between the baffle plate and the light output aperture;
a plurality of light sensors mounted on said plate so that each of said sensors intercepts the light energy transmitted through a different section across the width of said light output aperture, and with said plurality of sensors being aligned substantially across the maximum adjustable width of the light output aperture;
signal means coupled to said plurality of sensors for developing a first output signal representative of the light energy passing through portions of the pair of film strips as the film strips pass across the output aperture of the light source;
control means coupled to said signal means and to the adjustment control of the printing head for varying the width of the output aperture in response to said output signal; whereby the amount of printing light energy projected in series through each of the portions of the films as the films pass across the light source assembly is controlled thereby;
a light detector assembly mounted on said baffle plate so that said light detector assembly responds to light energy, transmitted through a section of said printing aperture adjacent to a leading edge of the aperture relative to the direction of movement of the film, to produce a second output signal representative of the light intensity received by said light detector assembly; and
processor means for generating a third signal representative of the variation of said second signal;
wherein said control means further includes circuitry for responding to the third signal to initiate the positioning of the adjustment control in response to the transparency of the film portion passing over the leading edge of the aperture.

13. A photographic printer comprising:
a light output printing aperture of adjustable width;
a light source for projecting light through said aperture;
means for continuously transporting a pair of film strips across said aperture so that light from said light source passes through said aperture and hence in series through the then exposed portion of said pair of film strips;
a plurality of light sensors mounted on the side of said film strips opposite from said light source, certain ones of said sensors being so arranged that each intercepts the light energy transmitted through a respectively corresponding portion of said aperture;
electric circuit means coupled to all of said sensors for receiving the output signals therefrom, said circuit means including means for generating a first output signal which continuously indicates the total light energy being transmitted by the then exposed portion of said film strips, and means for generating a second output signal indicative of the rate of change of said total light energy; and
means for controlling the width of said aperture in accordance with a composite function of both of said output signals.

14. A photographic printer as claimed in claim 13 in which one of said light sensors is mounted near the leading edge of said aperture, and has its output coupled to said means for generating said second output signal.

15. A sensor assembly for monitoring light energy projected in series through a portion of a pair of film strips as the films are moved across a light source assembly having a light output printing aperture of adjustable width, said sensor assembly comprising:
- a baffle plate positioned adjacent to and in alignment with the light output printing aperture, so that the pair of film strips pass between the baffle plate and the aperture;
- a plurality of electrically interconnected light sensors mounted on said baffle plate so that each of the sensors intercepts a different portion of the light energy transmitted through said light output aperture, and with said plurality of sensors being distributed substantially across the maximum adjustable width of the aperture; and
- a signal means coupled to all of said plurality of sensors for developing a first output signal as a function of the total light energy received by all of said sensors;
- said first output signal representing the average transparency of that portion of the films which is in alignment with the light output printing aperture;
- further comprising a first meter coupled to said signal means and responding to said first output signal for providing an indication of the light energy passing through said film strips, whereby the width of the light output printing aperture may be adjusted for a selected value of printing light energy; and
- said light sensors being semiconductor devices which respond to light energy in a selected frequency range and said signal means comprising means for connecting said semiconductor devices in parallel, whereby the first output signal is substantially a nonlinear representation of the light intensity, in said selected frequency range, passing through said pair of film strips.